L. R. GLASS.
LOCK NUT.
APPLICATION FILED AUG. 22, 1918.

1,299,702.

Patented Apr. 8, 1919.

Inventor
Louine R. Glass
By his Attorney
N. Dorsey Spencer

UNITED STATES PATENT OFFICE.

LOUINE R. GLASS, OF PASSAIC PARK, NEW JERSEY, ASSIGNOR OF ONE-THIRD TO HENRY H. HULL AND SIXTEEN ONE-HUNDREDTHS TO COULTER D. YOUNG, BOTH OF NEW YORK, N. Y.

LOCK-NUT.

1,299,702. Specification of Letters Patent. Patented Apr. 8, 1919.

Application filed August 22, 1918. Serial No. 250,951.

*To all whom it may concern:*

Be it known that I, LOUINE R. GLASS, a citizen of the United States, residing at Passaic Park, New Jersey, have invented certain new and useful Improvements in Lock-Nuts, of which the following is a clear, full, and exact description.

This invention relates to lock nuts and a general object of the invention is to provide a lock nut of simple and inexpensive construction which will effectively exert and durably maintain its gripping action upon the bolt and which will require no other manipulation than that employed with an ordinary nut, either to apply it to the bolt or to remove it therefrom.

The invention aims particularly to provide a lock nut, formed by a simple alteration of an ordinary nut, which will effectively grip and lock itself upon the bolt, when applied in the usual manner, and which, nevertheless, will not materially injure either the bolt thread or the nut thread by its locking action and can, therefore, be applied and removed and repeatedly used.

An important feature of the invention is the provision in a nut of a hinge line about which two relatively movable but integral parts of the nut may effect a relative turning movement under the action of the clamping pressure upon the clamping face of the nut, this line being so located in substantial tangency to the thread curvature that such relative movement does not effect the displacement of the threads of the two nut parts across the axis of the nut but insures a most effective gripping pressure upon the bolt threads substantially continuously about the bolt and also utilizes the clamping pressure upon the clamping face of the nut substantially to the point of tangency to effect such relative movement and such gripping pressure.

Another important feature of the invention is the retention of a sufficient part of the thread at the point of tangency to serve as a thread restoring die, when removing the nut from the bolt, in order to correct slight thread distortions caused by the clamping action.

Other objects and important features of the invention will appear from the following description and claims when considered in connection with the accompanying drawings, in which:

Figure 1:
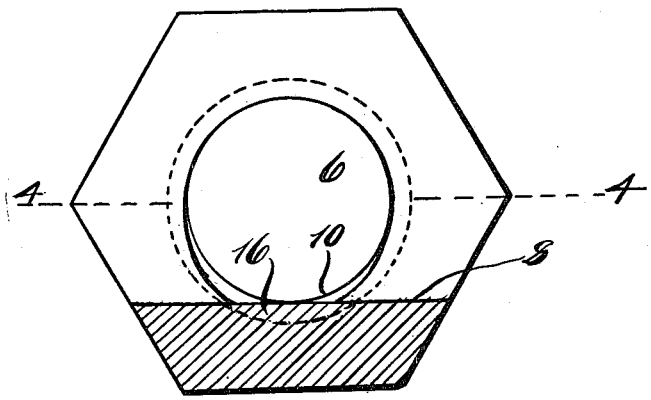
Figure 1 is a vertical section on the line 1—1 of Fig. 3, of a nut embodying the present invention.
Figure 2:
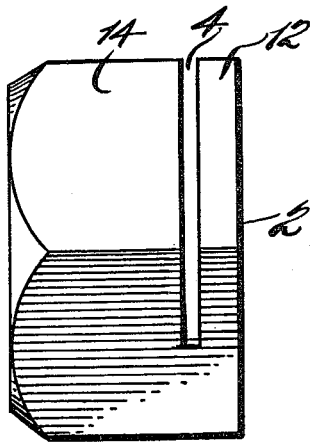
Fig. 2 is a side elevation.
Figure 3:
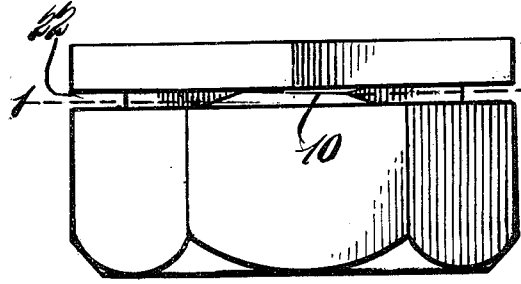
Fig. 3 is a plan view.

In forming the lock nut which constitutes the present invention, a nut of otherwise ordinary construction is provided relatively near its clamping face 2 with a slot 4 arranged substantially parallel to the clamping face 2, this slot extending across the bore 6 of the nut and having its bottom in a line or plane 8 preferably substantially tangential to the curve of the top of the thread 10 of the nut.

The slot 4 of the preferred form of the invention, shown in Figs. 1 to 5 inclusive, is of uniform width and is preferably of a width not greater than the thickness of the nut thread at its base, the width of the slot varying according to the amount of clamping pressure it is desired that the nut should exert.

The slot 4 divides the nut into two integral but relatively movable parts 12 and 14, the part 12 being relatively thin and flexible as compared with the part 14 and having thereon the clamping face 2 of the nut. As hereinabove pointed out, the slot 4 has its bottom in a line or plane tangential to the inner curvature of the threads 10 of the nut, or substantially tangential, whereby the portion 16 of the thread cut by the slot is left to form a thread restoring die, as shown clearly in Figs. 3 and 4, which helps to remove any thread distortions, caused by the locking action of the nut, when the nut is removed from the bolt.

Figure 5:
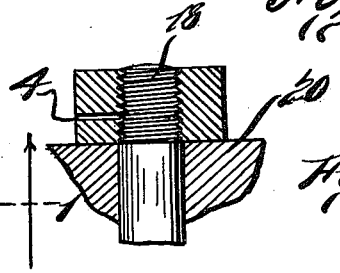
Fig. 5 is a fragmentary view showing, in section, the nut in clamping position upon a bolt.

From the foregoing description the locking action of the nut will be apparent. In Fig. 5 of the drawings the nut is shown in locking position upon a bolt 18. Referring to this figure, it will be seen that when the nut is screwed upon the bolt 18, as the clamping face 2 of the nut engages the surface 20 from which the bolt 18 projects, further screwing of the nut upon the bolt will cause the part 12 of the nut to be bent or swung about an axis in the line or plane 8 tangential to the thread 10, thus causing a thread or parts of threads of the bolt to be clamped between the parts 12 and 14 of the nut, thereby locking the nut against turning upon the bolt 18.

By having the hinge line or axis of relative swinging movement of the parts 12 and 14 in a line tangential to the thread 10 of the nut, I obtain clamping action substantially about the bolt to the point of tangency and avoid relative displacement of the threads of the two nut parts across the axis of the nut, such displacement not only tending to injure and distort the threads of the nut and bolt but also causing a less effective gripping action between the nut and bolt. Moreover, by my construction I obtain a maximum gripping effect from the clamping pressure on the face 2 without substantial distortion of the face 2 of the nut and without substantial distortion of the threads, either of the nut or of the bolt.

I am aware that nuts have heretofore been designed in which a slot has been embodied for clamping purposes, as illustrated in United States Letters Patent No. 188,055, granted March 6, 1877, to Alonzo Johnson, No. 1,039,916 granted October 1, 1912, to John J. Farrell, No. 672,785 granted April 23, 1901, to Peter Lahr and No. 825,085 granted July 3, 1906, to Louis Steinberger, but none of these prior constructions has utilized the principle of my invention of effecting a relative hinging or swinging movement of the nut parts about an axis substantially tangential to the curvature of the nut thread, whereby there is a mere bending of the axis of the nut but no lateral displacement of the nut threads across said axis. By my improved construction, as above pointed out, a more uniform and effective gripping action of the nut is obtained and the manipulation of the nut in applying it and removing it from the bolt more nearly approximates that of the usual nut.

Figure 6:
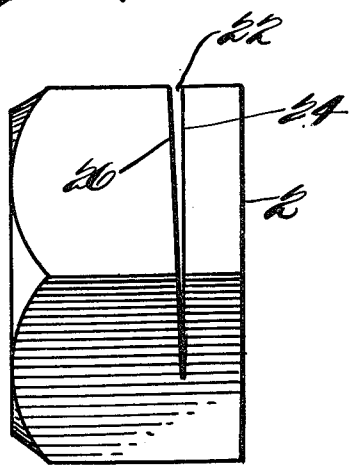
Fig. 6 illustrates a modified form of the invention.
Figure 4:
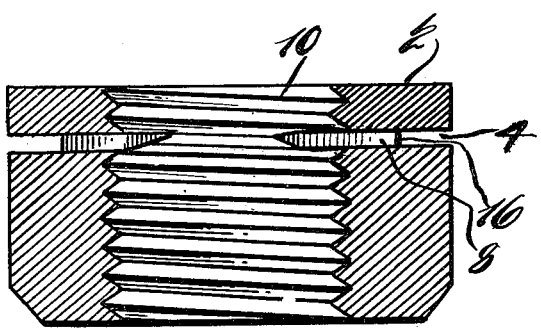
Fig. 4 is a horizontal section on the line 4—4 Fig. 1.

In Fig. 6 of the drawings I have shown a modified form of the nut in which the slot 22 is tapered, being preferably of such shape that it may be formed by cutting with a knife. In this form of the invention, the slot 22 preferably has its side 24 parallel to the clamping face 2 of the nut and its side 26 substantially at an inclination corresponding to the thread inclination.

What I claim as new is:—

1. A lock nut comprising a nut cut by a slot in a plane substantially parallel to and relatively near the clamping face of said nut, said slot extending across the bore of the nut and having its inner end substantially tangential to the thread curvature at the top of the thread, whereby clamping pressure upon the clamping face of said nut will effect, about said line of tangency as an axis, a relative hinging movement of the parts of said nut upon the two sides of said slot into thread clamping position.

2. A lock nut comprising a nut having relatively near and substantially parallel to its clamping face a slot of a width not greater than the thread thickness, said slot being cut into the nut substantially to a line upon the remote side of the bore of the nut which is tangential to the thread curvature at the top of the thread, the thread portion of the nut within the slot being left intact to constitute a thread restoring die when removing the nut.

Signed at New York city, N. Y., this 16th day of August, 1918.

LOUINE R. GLASS.